US008436905B2

United States Patent
Murphy et al.

(10) Patent No.: US 8,436,905 B2
(45) Date of Patent: May 7, 2013

(54) FRONT LENS SHUTTER MOUNT FOR UNIFORMITY CORRECTION

(75) Inventors: Robert H Murphy, Lancaster, MA (US); Christopher R Miller, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1837 days.

(21) Appl. No.: 10/521,031

(22) PCT Filed: Aug. 28, 2003

(86) PCT No.: PCT/US03/27034
§ 371 (c)(1),
(2), (4) Date: Jan. 12, 2005

(87) PCT Pub. No.: WO2004/027459
PCT Pub. Date: Apr. 1, 2004

(65) Prior Publication Data
US 2005/0231627 A1    Oct. 20, 2005

Related U.S. Application Data

(60) Provisional application No. 60/412,377, filed on Sep. 20, 2002.

(51) Int. Cl.
*H04N 5/225*    (2006.01)
(52) U.S. Cl.
USPC .................................................. 348/207.99
(58) Field of Classification Search .................. 348/243, 348/370
See application file for complete search history.

(56) References Cited

U.S. PATENT DOCUMENTS

| 4,161,000 | A |   | 7/1979  | Cleveland |
|-----------|---|---|---------|-----------|
| 4,363,034 | A |   | 12/1982 | Grancoin et al. |
| 4,646,156 | A |   | 2/1987  | Iizuka et al. |
| 5,081,530 | A | * | 1/1992  | Medina ........................ 348/46 |
| 5,162,943 | A | * | 11/1992 | Komatsu et al. ............. 359/571 |
| 5,373,320 | A |   | 12/1994 | Johnson et al. |
| 5,420,419 | A |   | 5/1995  | Wood |
| 5,420,421 | A | * | 5/1995  | Lindgren et al. .......... 250/252.1 |
| 5,489,776 | A |   | 2/1996  | Lung |
| 5,517,243 | A |   | 5/1996  | Kudo et al. |
| 5,528,035 | A |   | 6/1996  | Masarik et al. |
| 5,739,847 | A |   | 4/1998  | Tranchita et al. |
| 6,023,061 | A |   | 2/2000  | Bodkin |
| 6,061,092 | A | * | 5/2000  | Bakhle et al. ................ 348/243 |
| 6,144,031 | A |   | 11/2000 | Herring et al. |
| 6,181,484 | B1 | * | 1/2001 | Sato ............................. 359/692 |
| 6,208,393 | B1 |   | 3/2001 | Bawolek et al. |
| 6,515,285 | B1 |   | 2/2003 | Marshall et al. |
| 6,525,769 | B1 | * | 2/2003 | Thomas et al. .............. 348/243 |
| 6,992,712 | B2 | * | 1/2006 | Yoshida ....................... 348/243 |

OTHER PUBLICATIONS

PCT Search Report dated Mar. 12, 2004 of Patent Application No. PCT/US03/27034 filed Aug. 28, 2003.

* cited by examiner

*Primary Examiner* — Luong T Nguyen
(74) *Attorney, Agent, or Firm* — Maine Cernota & Rardin; Daniel J. Long

(57) ABSTRACT

An imaging system comprising a lens, a detector array (e.g., focal plane array), a signal processing module and a shutter, wherein the shutter is positioned in front of the lens (between the lens and the scene being imaged). This front lens shutter mount configuration allows offset correction to compensate for internal radiant flux and other deficiencies associated with conventional systems.

16 Claims, 2 Drawing Sheets

FRONT LENS SHUTTER MOUNT FOR UNIFORMITY CORRECTION

RELATED APPLICATIONS

This application claims priority to PCT Application No. PCT/US2003/027034, filed Aug. 28, 2003, which claims the benefit of U.S. Provisional Application No. 60/412,377, filed Sep. 20, 2002, both of which are herein incorporated in their entirety by reference.

FIELD OF THE INVENTION

The invention relates to imaging systems, and more particularly, to a shutter location technique for improved uniformity correction.

BACKGROUND OF THE INVENTION

Imaging systems have many applications, such as military targeting and night vision systems, and commercial digital cameras. A typical imaging system generally includes a lens that is configured to focus light or radiation onto a focal plane array (FPA) via an aperture. A shutter is interposed between the lens and the FPA, and operates to prevent a scene from imaging on the FPA. The shutter is typically open most of the time, and is closed for short periods of time during calibration.

To reduce the background noise, the FPA often needs to be cooled to cryogenic temperatures, typically less than 150 K. To reduce the background signal from the baffling, the baffling must either be cooled or a re-imaging optical design must be used in conjunction with an appropriately placed optical cold stop to block the baffling from the field-of-view of the FPA detectors. Such techniques allow a high signal-to-noise ratio to be maintained. However, cryogenically cooled IR imaging systems are relatively expensive and are associated with a number of difficulties related to maintaining cryogenic conditions.

Microbolometers are another type of IR FPA, which operate near room temperature, thereby eliminating the need for cryogenic cooling, as well as reducing cost and complexity of the system. A thermoelectric cooler can be attached to the back of the FPA, and a temperature controller and sensing scheme is employed to stabilize the temperature of the FPA and its housing at room temperature (about 22° C.). However, such a microbolometer cannot achieve the same high sensitivity as a cryogenically cooled imager. The noise due to the IR background signals from the optics, shutter, and baffling are present, just as in the cryocooled imager. In addition, the uncooled imager has added noise due to the ambient temperature uncooled detectors and their readout circuits that is not present in imagers with cooled FPA detectors.

Moreover, microbolometers may suffer from excessive spatial non-uniformity caused by the conjunction of four factors: (1) microbolometer detectors are DC coupled; (2) the steradiance seen by a microbolometer detector varies with the spatial position of the detector in the array; (3) the imaging device, including its optics, shutter, FPA, and baffling, is not iso-thermal; and (4) the setup calibration is done with an improperly placed shutter.

In more detail, a DC background signal, provided by each pixel of the FPA in the absence of an IR scene, is substantially higher in a non-cryogenic system as compared to a cryogenically cooled system. These DC background signals translate to lower signal-to-noise ratio and compressed dynamic range. The DC background signals can be removed, usually by AC coupling or subtraction methods. However, this does not improve the signal-to-noise ratio. In fact, background subtraction often degrades the signal-to-noise ratio.

To compensate for DC background signals, a calibration process can be performed, where the FPA is shielded from IR scenes, and a DC background signal is generated by each pixel of the FPA. The system DC background signal, given by the average DC background signal of each pixel, is provided on a pixel-by-pixel basis. When an IR scene is imaged, an offset attributed to the known DC background signal is accounted for, and the actual signals attributed to the imaged IR scene are computed, thereby providing a corrected scene image signal.

An imaging system's DC background signal can be periodically determined in the field by providing a shutter for blocking the camera aperture. The calibration procedure is typically performed each time the imaging system is powered up, so that a new system DC background signal is available for each power-up session. It is also typical that an imaging system be recalibrated each time any of the imaging optics of the system are changed or repaired, as well as at periodic intervals during normal imaging operation.

Conventionally, the location of the shutter in an uncooled IR imaging system is at the rear of the lens block. Resulting offset correction cannot, therefore, entirely correct for internal flux. Rather, some internal flux from the camera is blocked during the shuttering event so that temperature differences between the shutter and the internal housing result in non-uniformity (between the pixels of the FPA) after shuttering. In addition, blemishes or other imperfections in the FPA sensing window are more pronounced when the shutter is physically located between the lens and the FPA.

What is needed, therefore, is a shuttering technique that enhances uniformity correction after shuttering.

BRIEF SUMMARY OF THE INVENTION

One embodiment of the present invention provides an imaging system that includes a focal plane array (FPA) having a plurality of pixels, a lens adapted to focus radiation from a scene in front of the lens onto the FPA behind the lens, and a shutter located in front of the lens. The shutter has a closed state that produces a spatially uniform reference image signal and allows internal radiant flux of the system to reach detectors of the FPA, and an open state that allows an open state image signal that includes external scene radiation and internal radian flux from the system to reach detectors of the FPA. A signal processing module is operatively coupled to the FPA, and is adapted to correct the open state image signal based on the spatially uniform reference image signal.

The system may further include a shutter controller that is operatively coupled to the shutter, and is adapted to command the shutter to its opened and closed states. The system may further include a system controller that is communicatively coupled to the shutter controller and processing module, and is adapted to control operation of the imaging system. In one such embodiment, the system controller is communicatively coupled to a network thereby enabling the imaging system to communicate with other systems also communicatively coupled to the network. The system may further include a temperature controller (e.g., temperature cycling equipment or a laser) that is adapted for illuminating the scene with radiation, thereby allowing reflected radiation to be received by the system. Note, however, that thermal imaging applications do not require such a temperature controller for illumination, as the radiant energy from the scene is what is detected by the system.

In one particular embodiment, the shutter has a lens side surface that is located within five millimeters of the front of the lens (e.g., within 1 millimeter of the optic entrance pupil of the lens). Note that for any one session of imaging system operation, each of a plurality of open state image signals can be corrected based on the closed state image signal. In addition, the closed state image signal can be periodically generated to account for changes in the imaging system.

Another embodiment of the present invention provides a method for imaging a scene, where method is carried out by an imaging system configured with a front lens mounted shutter. The method includes closing the front lens mounted shutter so that external scenes are blocked from being imaged, and generating a closed state image signal that includes internal radiant flux of the system. The method proceeds with opening the front lens mounted shutter thereby allowing the imaging system to receive external scene radiation, and generating an open state image signal based on the received scene radiation. The method further includes correcting the open state image signal based on the closed state image signal.

In one such embodiment, correcting the open state image signal includes compensating for pixel-to-pixel non-uniformities of a detector array included in the imaging system, or compensating for offsets between the opened and closed states of the lens, or compensating for both pixel-to-pixel non-uniformities and offsets between the opened and closed states. In one particular embodiment, the external scene radiation includes IR radiation and the imaging system includes an IR sensitive FPA for generating the closed and open state image signals.

Another embodiment of the present invention provides a method for manufacturing an imaging system. The method includes providing a lens adapted to focus radiation from a scene in front of the lens onto a detector array behind the lens, and providing a shutter located in front of the lens. The shutter has a closed state that allows a closed state image signal that includes internal radiant flux of the system to be generated by the detector array, and an open state that allows an open state image signal that includes external scene radiation to be generated by the detector array.

In one such embodiment, the method further includes providing a detector array having a plurality of pixels for detecting scene radiation, and operatively coupling a signal processing module to the detector array, the signal processing module adapted to correct open state image signals based on closed state image signals. The method may further include operatively coupling a shutter controller to the shutter, the shutter controller adapted to command the shutter to its opened and closed states. Here, the method may further include operatively coupling a system controller to the shutter controller and processing module, where the system controller is adapted to control operation of the imaging system (e.g., issue commands to the shutter controller to open or close the shutter).

The method may further include providing a laser that is adapted to illuminate a scene with radiation, thereby allowing reflected radiation to be received by the system. Note that the laser (or other scene illuminating device) can also be controlled by the system controller. Recall, however, that some thermal imaging applications (e.g., 3 to 5 and 8 to 12 micron bands) do not require a laser for illumination, as the naturally occurring radiant energy from the scene is what is detected by the system. In one particular embodiment, the shutter has a lens side surface that is located within five millimeters of the front of the lens. For example, the shutter is located approximately 1 mm in front of the lens.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
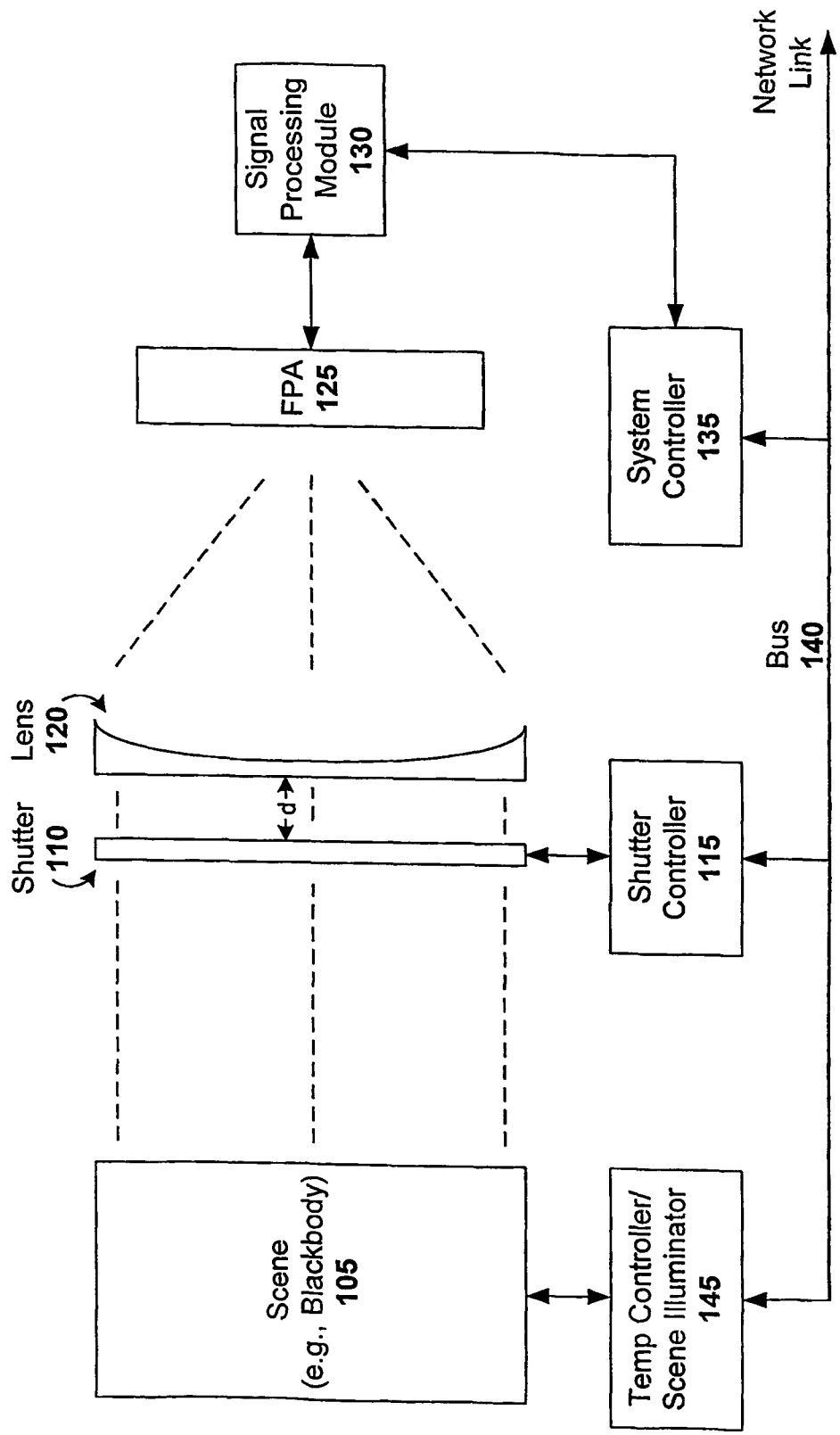
FIG. 1 illustrates a block diagram of an imaging system configured in accordance with one embodiment of the present invention.

FIG. 1 is a block diagram illustrating an imaging system configured in accordance with one embodiment of the present invention. The system includes a shutter 110, a shutter controller 115, a lens 120, a focal plane array (FPA) 125, a signal processing module 130, and a system controller 135. A scene 105 is also illustrated, and in this case, the scene temperature is being controlled by a temperature controller/scene illuminator 145. The system controller 135 is communicatively coupled via the bus 140 to the shutter controller 115 and processing module 130, as well as the temperature controller/scene illuminator 145.

Overview

It is generally known that objects or scenes at any temperature radiate heat energy. In heat transfer by radiation, electromagnetic waves carry energy from one object to another. This type of energy transfer can occur through a vacuum. In the example shown in FIG. 1, the scene 105 is a blackbody, but it could be any object or surface area that radiates heat energy. The temperature of the scene 105 can vary within a wide range, for example, from 0°K. to 6000°K. The temperature of the scene 105 might remain fairly constant (e.g., such as jet exhaust or a human), or it may transition (e.g., under the control of temperature controller 145).

In this example, radiation is emitted from the scene 105, and is provided to lens 120 when shutter 110 is commanded to its open state by shutter controller 115. On the other hand, the radiation from the scene 105 is blocked from the lens 120 when shutter 110 is commanded to its closed state by controller 115. The radiation allowed to pass by shutter 110 is focused onto the FPA 125 by the lens 120. The pixels of the FPA each detect respective intensities from the received radiation, and provide corresponding electrical signals. These electrical signals are then provided to the signal processing module 130, which is adapted to analyze the signals in accordance with the particular imaging application.

The system controller 115 controls the operation of each of the shutter controller 115, the signal processing module 130, and the temperature controller 145. The optional temperature controller 145 can be used to control the temperature of the scene 105 (e.g., a programmable temperature environment for experimental or testing applications). Alternatively, the temperature controller 145 can be used to effectively illuminate the scene 105 (e.g., a laser beam capable of striking the scene and being reflected back to the FPA 135). In any event, the scene 105 emits radiation (whether naturally occurring or induced by a temperature controller 145) which is captured by the FPA 125. The resulting detected signals are then processed accordingly. The system is communicatively coupled to a network.

Front Lens Shutter Mount

The lens 120 is interposed between the scene 105 and the FPA 125, with the shutter 110 located between the scene 105 and the lens 120. Conventionally, the shutter location is on the other side of the lens 120, proximate the FPA 125, as previously explained. Such a conventional shutter mount allows the shutter to become hotter than the lens housing (from the internal radiant self-heating), and creates a large change in average FPA output data between the open and closed states of the shutter.

By locating the shutter 110 in front of the lens 120 in accordance with the principles of the present invention, the delta in average FPA output data between the open and closed states of the shutter 110 is significantly reduced. Thus, non-uniformities that arise due to pixel-to-pixel response variations are avoided, and an offset correction can be determined to compensate for internal radiant flux of the system. Other benefits to this configuration include the elimination of optical spots, reduction in spatial noise at high internal ambient temperatures, and reduction in large area non-uniformity (based on pixels of the FPA 125).

Recall that placing the shutter 110 in front of the lens 120 allows internal camera flux to reach detectors of the FPA 125 during shutter calibration. Thus, the shutter 110 is on the scene side of the lens 120, and within a distance d (shown in FIG. 1) of the entrance pupil. In one particular embodiment, the shutter 110 and lens 120 are mounted into a sub-housing, where the distance d is 1 to 20 millimeters. However, it will be appreciated that the distance d can be varied depending on the packaging and desired overall size of the system.

Note that the distance between the lens 120 and the FPA 125 will depend on factors such as the focal length of the lens 120 and the focusing capability of the imaging system (e.g., fixed or variable position lens). Further note that the shutter 110 does not need to be enclosed in a sub-housing. However, doing so protects the shutter 110 from handling damage and the environment.

The shutter controller 115 operates under the control of the system controller 135, and moves the shutter 110 between its open and closed states. Factors such as shutter speeds and aperture size will depend on the particular application, and the present invention is not intended to be limited to any one such configuration. Rather, the present invention can operate in any one of a number of imaging applications where the shutter can be beneficially placed in front of the lens, so as to reduce or otherwise eliminate the delta in average FPA output data associated with the open and closed states of the shutter 110, thereby improving uniformity of the system.

The system controller 135 can be, for example, a microcontroller unit (MCU) configured with a programmable microprocessor, memory, and a number of input and output ports for receiving requests and other information, and providing control signals, respectively. A number of processes may be programmed into and executed by the MCU. For example, the process performed by the shutter controller 115 for effecting the opening and closing of the shutter 110 can be programmed into the MCU. Likewise, the signal processing module 130 can be programmed into the MCU. In addition, a method for imaging a scene in accordance with the principles of the present invention can be programmed into the MCU. One such example method is discussed in reference to FIG. 2.

Note that the bus 140 is further coupled to a network via a communications link. Such a link may be desirable, for example, where the imaging system is a sub-system in an overall application (such as in an on-board targeting application where the received image data processed by the signal processing module 130 is used to direct a guidance sub-system). In such applications, the imaging system can transmit and receive data from other sub-systems as necessary. Further note that the communications link may be wired or wireless.

Each of the shutter 110, controller module 115, lens 120, FPA 125, signal processing module 130, system controller module 135, and scene illuminator module 145 can be implemented in conventional technology (e.g., hardware, software, firmware, or any combination thereof). For example, each module can be implemented as a set of instructions executing on a microprocessor or other suitable processing environment The shutter controller module 115, signal processing module 130, and the scene illuminator module 145 can each be integrated into the system controller module 135 as subroutines. Alternatively, the modules can be implemented in a purpose built semiconductor (e.g., FPGA or ASIC).

Variations on the configuration illustrated in FIG. 1 will be apparent in light of this disclosure. For instance, numerous lens types, detector types, and shutter types can be employed to carry out the principles of the present invention. Likewise, numerous scene irradiance, shutter control, signal processing, and overall system control techniques can be employed here as well. The present invention is not intended to be limited to any one such configuration, and may be embodied in a number of forms (e.g., such as an imaging system and method of manufacturing same, as well as a method for imaging a scene using the system).

Methodology

Figure 2:
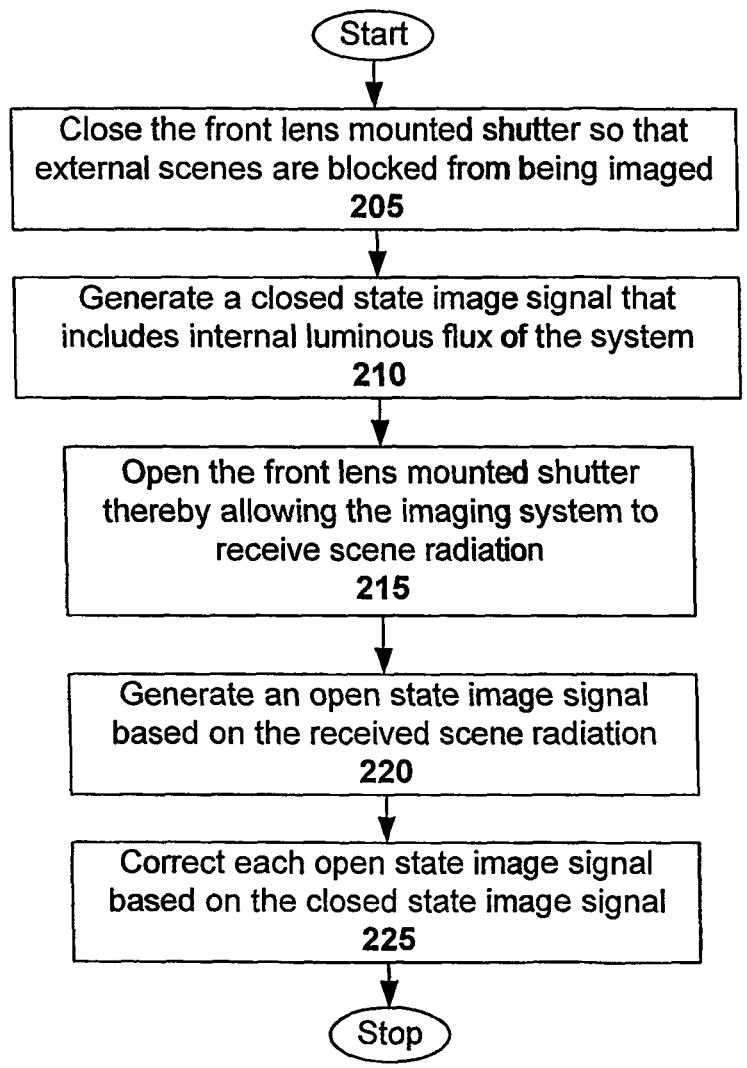
FIG. 2 illustrates a method for imaging a scene in accordance with one embodiment of the present invention.

FIG. 2 illustrates a method for imaging a scene in accordance with one embodiment of the present invention. The method is carried out by an imaging system configured with a front lens mounted shutter, where the shutter is mounted between the scene and the lens, as shown by the example system of FIG. 1. The method begins with closing 205 the front lens mounted shutter so that external scenes are blocked from being imaged. The method continues with generating 210 a closed state image signal that includes internal radiant flux of the system. This closed state image signal can be used to calibrate or otherwise compensate for pixel-to-pixel non-uniformities and offsets between open and closed states.

The method proceeds with opening 215 the front lens mounted shutter thereby allowing the imaging system to receive scene radiation. In one such embodiment, the imaging system includes an IR sensitive FPA, and the scene radiation includes IR radiation. However, other scene radiation in the form of heat or light can be received and detected by any one of a number of detectors. The present invention is not intended to be limited any one such configuration. The method continues with generating 220 an open state image signal based on the received scene radiation.

Note that the opening and generating steps may be repeated a number of times as necessary, depending upon the desired imaging results. In addition, the exposure time of each open state may vary depending upon the application. For instance, the open state duration might be on the order of several milliseconds for photographing applications, or for extended periods (several minutes to hours) for target tracking or night vision applications.

The method proceeds with correcting 225 each open state image signal based on the closed state image signal. The correcting may include, for example, compensating for pixel-to-pixel non-uniformities of a detector array included in the imaging system, or compensating for offsets between the opened and closed states of the lens, or compensating for both pixel-to-pixel non-uniformities and offsets between the opened and closed states.

In one embodiment, the correction is carried out by a programmable digital signal processing module or other suitable processing environment (e.g., microprocessor) that is operatively coupled to the detector array as discussed in reference to FIG. 1. However, any number of conventional signal processing techniques can be used here to perform this correction, thereby providing calibrated image signals that compensate for radiant flux of the system.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A thermal imaging based system adapted for imaging infra-red radiation that is emitted by a black body, the thermal imaging based system comprising:
    a focal plane array (FPA) having a plurality of pixels sensitive to infra-red radiation;
    a lens disposed between the black body and the FPA and adapted to focus the infra-red radiation emitted by the black body in front of the lens onto the FPA behind the lens, the plurality of pixels of the FPA having sufficient infra-red sensitivity so as to detect the infra-red radiation emitted by the black body as well as infra-red radiation emitted by the lens;
    a shutter located between the lens and the black body, the shutter having a closed state and an open state wherein the closed state prevents the infra-red radiation emitted by the black body from reaching the FPA while allowing the infra-red radiation emitted by the lens to by detected by the FPA as a reference image signal, and the open state allows both the infra-red radiation emitted by the black body and the infra-red radiation emitted by the lens to be detected by the FPA as an open state image signal; and
    a signal processing module operatively coupled to the FPA, and adapted to correct the open state image signal based on the reference image signal.

2. The system of claim 1 further comprising:
    a shutter controller operatively coupled to the shutter, and adapted to command the shutter to its opened and closed states.

3. The system of claim 2 further comprising:
    a system controller communicatively coupled to the shutter controller and the signal processing module, and adapted to control operation of the imaging system.

4. The system of claim 3 where the system controller is communicatively coupled to a network thereby enabling the imaging system to communicate with other systems also communicatively coupled to the network.

5. The system of claim 1 wherein for any one session of imaging system operation, each of a plurality of open state image signals are corrected for pixel-to-pixel non-uniformities and offset based on the open and closed state image signals.

6. The system of claim 1 wherein the closed state image signal is periodically generated to account for changes in the imaging system.

7. A method for thermally imaging a black body, comprising:
    providing a thermal imaging based system configured with a lens a focal plane array (FPA), the FPA having sufficient infra-red sensitivity so as to detect infra-red radiation emitted by the black body as well as infra-red radiation emitted by the lens; and
    a shutter, the shutter being disposed between the lens and the black body;
    closing the shutter so that the infra-red radiation emitted by the black body is blocked from reaching the FPA;
    generating a closed state image signal that includes the infra-red radiation emitted by the lens;
    opening the shutter, thereby allowing the infra-red radiation emitted by the black body to reach the FPA;
    generating an open state image signal that includes both the infra-red radiation emitted by the black body and the infra-red radiation emitted by the lens; and
    correcting the open state image signal based on the closed state image signal.

8. The method of claim 7 wherein correcting the open state image signal includes compensating for pixel-to-pixel non-uniformities of the FPA.

9. The method of claim 7 wherein correcting the open state image signal includes compensating for offsets between the opened and closed states of the shutter.

10. The method of claim 7 wherein correcting the open state image signal includes compensating for pixel-to-pixel non-uniformities and offsets between the opened and closed states of the shutter.

11. A method for manufacturing an imaging system adapted for imaging infra-red radiation emitted by a black body, the method comprising:
    providing a thermal imaging based system comprising a lens and a thermal imaging detector array, the lens being adapted to focus infra-red radiation emitted by the black body onto the thermal imaging detector array, the thermal imaging detector array having sufficient sensitivity to detect the infra-red radiation emitted by the black body, as well as infra-red radiation emitted by the lens; and
    providing a shutter located between the black body and the lens, the shutter having a closed state that prevents the infra-red radiation emitted by the black body from reaching the lens while allowing the thermal imaging detector array to generate a closed state image signal comprising the infra-red radiation emitted by the lens, and an open state that allows the detector array to generate an open state image signal comprising both the infra-red radiation emitted by the lens and the infra-red radiation emitted by the black body.

12. The method of claim 11 wherein the detector array comprises a plurality of pixels for detecting the infra-red radiation; the method further comprising:
    operatively coupling a signal processing module to the detector array, the signal processing module being adapted to correct open state image signals based on closed state image signals.

13. The method of claim 12 further comprising:
    operatively coupling a shutter controller to the shutter, the shutter controller adapted to command the shutter to its opened and closed states.

14. The method of claim 11 further comprising:
    operatively coupling a system controller to a shutter controller and a processing module, the system controller being adapted to control operation of the imaging system.

15. The system of claim 1, wherein the shutter has a lens side surface that is located within five millimeters of a front side of the lens.

16. The system of claim 1, wherein the shutter has a lens side surface that is located within one millimeter of a front side of the lens.

* * * * *